June 24, 1941. W. R. HAINSWORTH 2,246,676
REFRIGERATOR
Filed Dec. 1, 1938

INVENTOR.
William R. Hainsworth
BY
D. E. Heath
ATTORNEY.

Patented June 24, 1941

2,246,676

UNITED STATES PATENT OFFICE 2,246,676

REFRIGERATOR

William R. Hainsworth, Larchmont, N. Y., assignor to Servel, Inc., New York, N. Y., a corporation of Delaware Application December 1, 1938, Serial No. 243,340

1 Claim. (Cl. 62—89)

Figure 1:
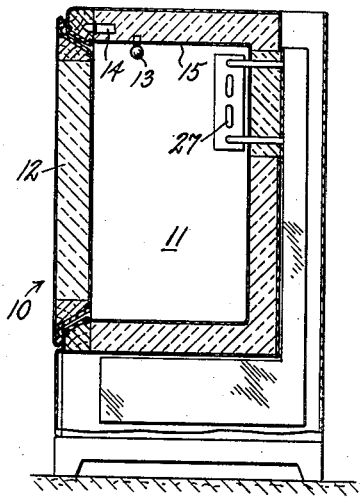
Figure 2:
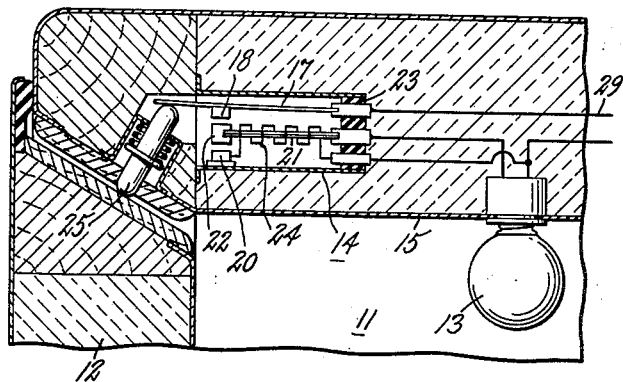
Figure 3:
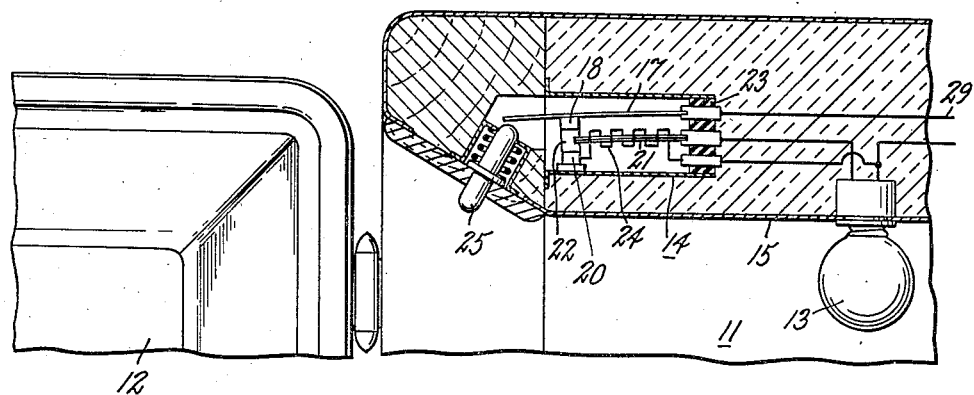
Figure 4:
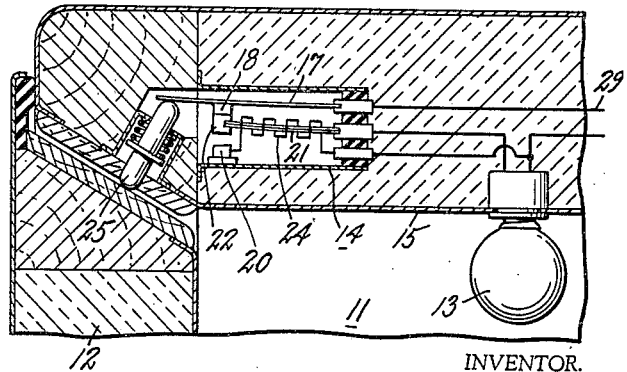

My invention relates to food preservation by the combined effects of refrigeration and light, and it is an object of the invention to carry out such food preservation in a refrigerator by an improved method and apparatus as will appear from the following description in connection with the accompanying drawing, in which Fig. 1 is a sectional part view of a refrigerator embodying the invention, and Figs. 2, 3, and 4 are views showing a part in Fig. 1 in different positions of operation.

Referring to Fig. 1, a refrigerator 10 provides a thermally insulated food storage compartment 11 accessible by means of a door 12. An evaporator or cooling element 27 of a refrigeration apparatus unit is located in the upper back part of compartment 11 for cooling air in the compartment. On the ceiling of the storage compartment 11 is a lamp 13. This lamp is of a type which emits rays of short wave length, referred to as ultra-violet rays.

Low temperatures produced by refrigeration inhibit propagation of food spoiling bacteria. There is probably no killing effect. Short ultra-violet rays kill bacteria but apparently do not inhibit propagation. In order to preserve food by ultra-violet light alone, it would be necessary to kill bacteria by light rays and the bacteria propagation rate is great at high atmospheric temperatures. Food preservation is carried out by refrigeration alone for limited lengths of time because proper cooling inhibits bacteria propagation. Preservation of food by refrigeration could be carried out for longer periods if there were fewer bacteria present. Also, preservation of food can be carried out at higher temperatures if the greater bacteria propagation rate is balanced by killing of bacteria. It is thus advantageous to combine the effects of proper ultra-violet rays and refrigeration in the preservation of food.

Short light rays are usually measured in Ångström units, one unit being $10^{-6}$ centimeter. The shorter rays have a greater killing effect, meaning that the shorter rays kill a greater number of bacteria in a given length of time or the same number of bacteria in a shorter length of time. However, shorter rays in air produce ozone which is detrimental to food preservation on account of its odor and effect on food flavor. Rays shorter than about 2400 Ångström units produce too much ozone. The ultra-violet ray source 13 should therefore provide a preponderance of rays in the neighborhood of 2500 Ångström units to obtain the greatest bacteria killing effect without production of ozone.

An ultra-violet light source placed in a refrigerator storage compartment also emits heat which places an extra load on the refrigeration apparatus which may negative the beneficial result of the addition of the light source. I therefore provide in a refrigerator storage compartment a source of ultra-violet light which operates only part of the time that the refrigerator is in use and automatically correlates the operation of the light source with the use of the refrigerator as indicated, for instance, by opening and closing of the door.

The lamp 13 in the ceiling 15 is connected to an electric current supply line 29 through a switch 14 arranged to be operated by opening and closing of the refrigerator door 12. Switch 14 includes a spring strip 17 having a contact 18, a contact member 20, and a bimetal element or strip 21 having a double contact 22. The strips 17 and 21 are mounted at one end on an insulating block 23. The bimetal thermostatic strip 21 is located below the strip 17, and the double contact 22 arranged to engage both contacts 18 and 20 upon flexure of the strips.

A heating element 24 is arranged in heating relation to the thermostatic strip 21 and is connected to the line 29 only when all of the contacts 18, 20 and 22 are engaged.

Spring strip 17 is arranged so that its contact 18 bears against contact 22 and causes contact 22 to bear against contact 20, as shown in Fig. 3. When the refrigerator door is opened the switch operating member 25 is in the position shown in Fig. 3. The heater 24 and lamp 13 are both connected in circuit. The bimetal strip 21 becomes heated and tends to flex upward.

When the door 12 is closed, the switch operating member 25 moves strip 17 upward. The bimetallic strip 21 also moves upward so that contacts 18 and 22 remain engaged while contacts 20 and 22 become disengaged. The lamp 13 continues to burn but the heater 24 is turned off. This is shown in Fig. 4.

If the door 12 is not again opened to start the heater 24, the bimetal strip 21 cools until it moves downward and disengages contacts 18 and 22, as shown in Fig. 2, to open the circuit of the lamp 13.

The lamp 13 continues in operation as long as door 12 is opened at intervals less than the cooling interval of the bimetal strip 21. The switch operation may be made to have snap action and other time delay devices may be used in place of the bimetal strip 21 and heater 24.

Various other changes and modifications may be made within the scope of the invention which is not limited except as set forth in the following claim.

What is claimed is:

A refrigerator having a storage compartment accessible by means of a door, refrigeration apparatus for cooling air in said compartment, a source of ultra-violet light for irradiating food or the like in said compartment, a switch operated by movement of said door for controlling said light source, and means for delaying opening of said switch after closing of the door comprising a thermostatic element and an electric heater for the element connected to be turned on and off upon opening and closing of the door.

WILLIAM R. HAINSWORTH.